July 15, 1924.
P. L. HATFIELD
DRAFT OPERATED LIFTING-DEVICE FOR SEEDING MACHINES
Filed Aug. 8, 1919
1,501,279
2 Sheets-Sheet 1
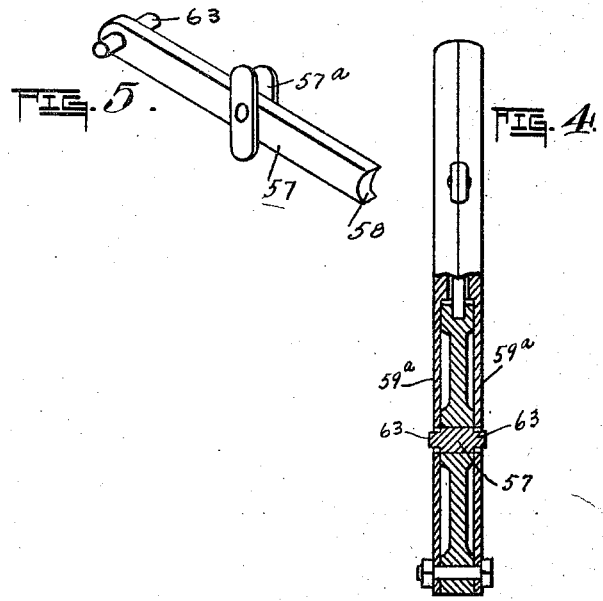
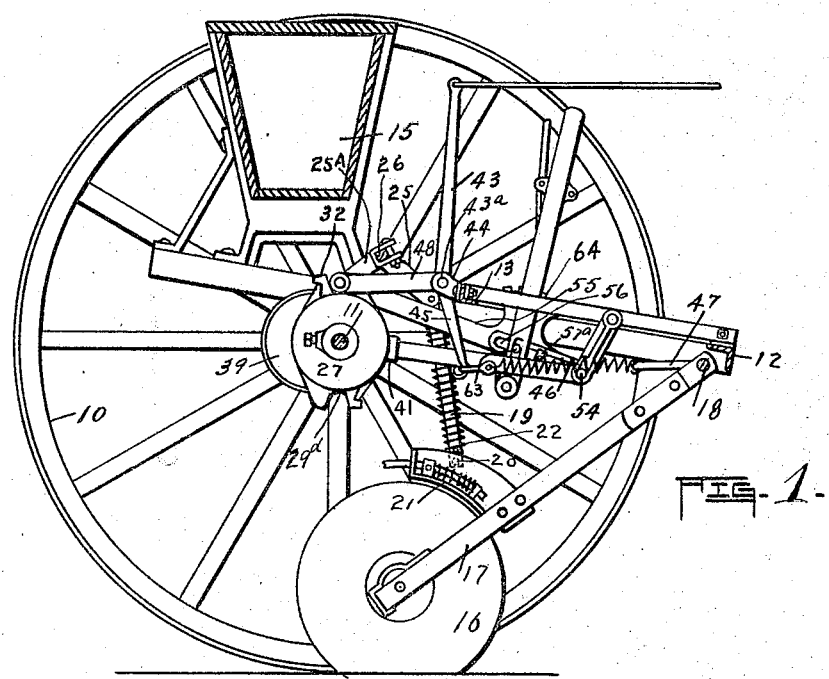

July 15, 1924.
P. L. HATFIELD
1,501,279
DRAFT OPERATED LIFTING DEVICE FOR SEEDING MACHINES
Filed Aug. 8, 1919
2 Sheets—Sheet 2
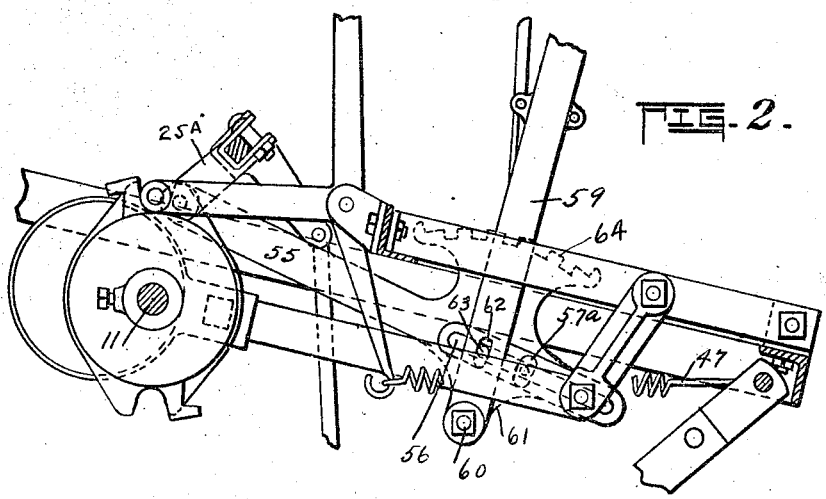
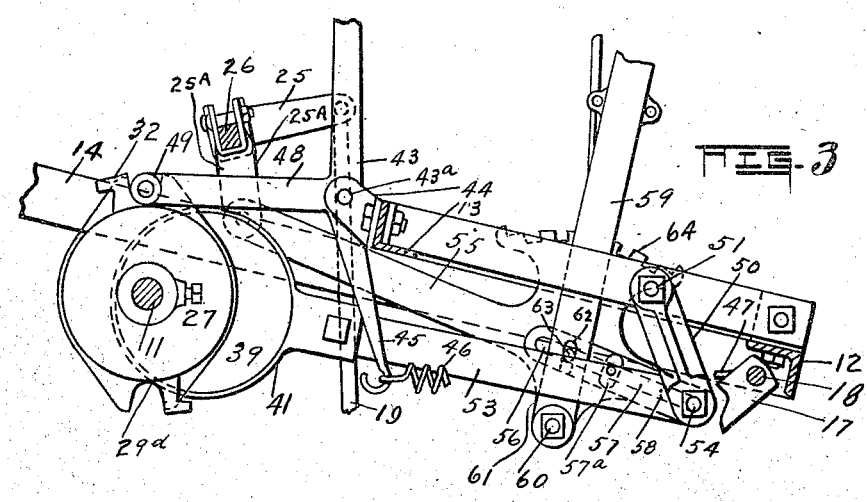
INVENTOR.
Paul L. Hatfield
BY H. V. Tefft
ATTY.

Patented July 15, 1924.

1,501,279

UNITED STATES PATENT OFFICE.

PAUL L. HATFIELD, OF PEORIA, ILLINOIS, ASSIGNOR TO PEORIA DRILL AND SEEDER CO., OF PEORIA, ILLINOIS, A CORPORATION OF ILLINOIS.

DRAFT-OPERATED LIFTING DEVICE FOR SEEDING MACHINES.

Application filed August 8, 1919. Serial No. 316,019.

*To all whom it may concern:*

Be it known that I, PAUL L. HATFIELD, a citizen of the United States of America, residing at Peoria, in the county of Peoria and State of Illinois, have invented certain new and useful Improvements in Draft-Operated Lifting Devices for Seeding Machines, of which the following is a specification.

The invention herein relates to seeding machines and has direct reference to improved draft operated lifting mechanism and detail mechanism for controlling the lifting mechanism and for regulating the working depth of the soil openers or shoes.

The present invention is directed particularly to mechanism designed to facilitate a maximum fixed point of elevation of the furrow openers or shoes, of a seeding machine, but permitting a variation in extent of the lowering of said furrow openers or shoes.

A further object of the invention is to simplify present known lifting mechanisms of the class to which applicant's device belongs to increase the efficiency of the same, reduce cost and promote durability.

This invention includes the detail parts and combinations of parts hereinafter more particularly pointed out.

Referring to the drawings—

Fig. 1 is a view showing the lifting mechanism and associated soil openers in a lowered position.

Fig. 2 is a detail view in elevation, showing parts of the lifting devices and the manner of co-relating them to a seeding device;

Fig. 3 is a view similar to that shown in Fig. 2 but showing the parts in different relative disposition;

Fig. 4 is a detail view, partly in section, of a reach member showing in association a shiftable member in a slotted way therein, and adapted to facilitate variable limitation of the active stroke of said reach, as applied to means adapted to be actuated thereby; and also shows a lever for operating the shiftable member.

Fig. 5 is a view in perspective of the aforementioned adjustable member in said reach member;

By reference to the patent art relating to power lifting devices, for furrow openers, it will be noted that there is a fixed limit of movement of the furrow openers in raising or lowering and that associated means for effecting differences in depth of soil working involves a raising or lowering of the complete gang sets, as such gangs of necessity move through absolutely limited and uniform distances, whatever the positioning of said gangs may be, hence with such adjustments, a constant variation with respect to the high point of raising following such changes of position. In the operation of seeding machines of this class, feeding devices thereof are operable only when the furrow openers are at work. When the furrow openers are elevated, the feeding devices are out of action and in building machines employing power lift devices, it has been the custom to provide interruptable driving connection to the feeding devices actuated by the raising or lowering of the furrow openers, to establish or break such driving connection, and there is shown herein, in figures showing certain details, a commonly used control mechanism for the feeding devices, but it has been found that in the practical working of such devices, in connection with power lifting devices, wherein the height of raising the gangs is varied, that it is difficult, if not quite impossible, to provide associated tripping mechanism for the drive to the feeding devices assured of correct working under all positionings of the gang sets, and in developing the present invention, it has been in mind to overcome this difficulty by establishing a definite and fixed high point of raising of the furrow opener gangs, whereby simple tripping devices might be employed that would require no changing or readjustment.

In connection with the known art, wherein power operated lifts are employed with the attendant variation of the limit of the height of raising with the variation in the matter of soil penetration by the furrow openers, under certain conditions of deep penetration, the furrow openers when raised to the highest limit, are not sufficiently elevated to provide clearance for the disks as the machine is turned in the field, or is transported from place to place. The present improvement corrects this difficulty.

At each side of the seeding machine is a carrying wheel as 10, in which is supported an axle or shaft 11, whereby the several parts of the machine are supported. The shaft is operatively connected so it will be driven by the carrying wheels or at least one of them, and usually by one way connection so the shaft will be driven by the carrying wheels only when the machine travels forwardly. A frame formed of angle iron bar is provided, and included in such framing are the bars 12—13 extending the width of the machine, and bars as 14 extending lengthwise of the machine. A seed box 15, which may be of any suitable construction, extends across the machine, and is suitably supported upon the framing, and immediately beneath the box is designed to be provided a series of seeding devices (not shown) which may be of any suitable and well known construction. These seeding devices are designed to be operated from a shaft (not shown) which is optionally operatively connected to the wheel shaft or axle 11, usually through and by means of a sprocket slidably mounted on the wheel shaft by means of controlled clutch devices, but as the seeding devices and the connections for driving the same form no part of the present invention, these parts are not illustrated and will not be described in detail.

A series of furrow openers is designed to be provided, although only one is shown herein, for opening the soil, and in the construction shown, these furrow openers comprise disks as 16 journaled in drag bars 17 which latter are pivoted to the framing member as at 18. The furrow openers are arranged to be operated in gangs, each gang usually extending from the center of the machine to the end thereof. Each drag bar is operatively connected to a rock shaft by a connection consisting of a rod 19, which is pivoted as at 20 to extension member 21 from the drag bar, a spring 22 around said rod, a trunnion collar carried and slidable on the said rod, provided with trunnions, and adapted to engage a stop at the upper end of said rod 19, and an arm 25 on the rock shaft. Rock shafts 26 are designed to be provided to operate each drill gang and these shafts are journaled in suitable bearings in the frame (not shown). By employing independent shafts, each of the said opener gangs may be operated independently.

A draft operated lifting mechanism is provided for each gang and is connected to each of a pair of rock shafts employed in a double machine so that the gangs may be independently lifted by such mechanism.

As herein shown 29 is an eccentrically disposed member upon axle 11 to which is connected an operating arm active in moving the gang members.

Attention is now called to a control for these members, comprising a controller arm 43, pivoted, as at 43$^a$, to bracket member 44, which is attached to framing member 13, said controller arm being provided with an extension arm 45, the lower end of which is held under a forwardly exerted tension through and by means of tension members including a coil spring as 46, and suitable connecting means respectively at one end with extension arm 45 and a stud member 47 suitably connected with the framing. Centering upon the pivot point 43$^a$ for controller lever 43, is the rearwardly extending arm 48 rigidly secured to said controller arm and forming a part thereof, said rearwardly extending arm being provided with a roller member 49 which has a constant bearing relation with the peripheral flange member 29$^c$ of disk 29. The controller lever 43 is designed to control the locking or unlocking of disk 29 with relation to the constantly turning flanged disk member 27. In exercising this control, we will assume that the parts, including disk member 29, and locking lever 32 and the control member including roller 49, are in the relative positions shown in Fig. 1, at which time the locking lever will have been thrust rearwardly against the tension of coil spring members 36, by roller member 49 which then is lodged in one of seats 29$^d$ of flange 29$^a$, whereby dogs 31 will have been shifted out of engagement with ratchet teeth 28 on the flanged portion of disk 27, thus reducing disk member 29 to a condition of rest, and also eccentric wheel 39 connected therewith. Forward actuation of controller arm 43 serves to raise arm 48 so that roller member 49 thereon will be in relief of the stop projections 33 on locking lever 32, resulting in the immediate return of said lever to the position with respect to roller seat 29$^d$, which results in dogs 31 engaging ratchet teeth 28 on continuously turning disk 27, whereby disk 29 and the attached eccentric wheel 39 are turned therewith until the next unclutching position is reached, which said position is at the oppositely disposed roller seat 29$^d$. When this position is reached, the roller 49 will have traveled over one section of the face of flanged member 29$^c$, and will have engaged contact portion 33 on locking lever 32 and will have shifted the same forwardly to a point in advance of said roller seat, thereby causing dogs 31 to be disengaged from the ratchet teeth on disk 27.

In the relationship of the locking roller 49 and the locking seat 29$^d$ on disk member 29, as shown in Fig. 1, where the eccentric wheel is shown in position to effect its full limit of retraction of the connected bar member, the furrow openers will have been depressed and are there maintained during service for cultivation. Release of roller member 49 from the locking seats in disk 29, through manipulation of the controller lever, effects an instant clutching of dog bearing disk 29 to continuously driven disk 27, causing it and the eccentric 39 to be turned with the axle, and with such turning, and in accordance with the position of the eccentric, the connected bar will be extended or retracted to the end that the furrow openers are raised or lowered.

Referring to the particular means here employed for rocking shaft 26, a furcated rocker or centering member 50 is pivoted to the framing as at 51. 41 is an eccentric strap cooperating with eccentric 39; 53 is a bar or reach connected with said eccentric strap and pivoted to the centering pin 54 of furcated rocker member 50. 55 is a bar connecting a rocker arm 25ª to centering pin member 54 on rocker member 50.

In the relationship of bar 53 to eccentric 39, and rocker member 50, said arm is moved through certain defined limits to the end of effecting movement of rocker arm 25ª for the purpose of raising and lowering the furrow openers but bar 55 is designed to be related to rockable member 50 in a manner to co-act respectively with said arm and rocker arm 25, that in the forward projection of bar 53 a certain fixed and definite point of high elevation of the furrow openers will be attained, but permitting in the reverse movement of the furrow openers, that is, the lowering movement to provide limits or variation of working depth for the furrow openers, and consequently, a variation of the distance of movement thereof from the relatively high point to the low point. In the previous art, as heretofore noted, variation of working depth was accomplished by swinging the gang frames as a whole from higher to lower or the reverse positions, which resulted in the changing of the relative high point of elevation of the furrow openers. The particular means here provided for effecting variation in the amplitude of movement of the furrow openers includes slotting of bar 55, as at 56, and providing shiftable spacing or filler member 57 carried in said slot, but relatively shorter than the slotted way 56 in said bar 55, and fashioned at one end as at 58 (see Fig. 5) for coincidence with the shape of the pin or centering member 54 on rocker member 50. 57ª are guide members attached to the filler member and overlying the edges of the slot.

Filler member 57 is adapted to be shifted lengthwise of slotted way 56 and to this end, shifting and locking lever 59 is provided, the same being pivoted, as at 60, to a depending extension 61 from bar 55, said bar being provided with vertical slots or clearance ways 62 in the relatively spaced members 59ª of lever 59, said ways engaging studs 63 on filler member 57, whereby as lever 59 is moved, the filler member will be shifted in the slotted way in bar 55. To effect a locking of the filler member in different positions, a notched rack 64 is attached or may form an integral part of bar 55, whereby through the instrumentality of locking means on lever 59, the latter may be locked in connection with said rack to effect a definite positioning of said filler member.

In the operation of the specially designed parts for effecting the raising and lowering movement, and particularly the operation to vary the amplitude of movement of the furrow openers, it will be noted that eccentric member 39 is moved to project bar 53 to its forward limit. In accomplishing this, it acts through centering pin member 54 to advance bar 55 within limits to give rocker arm 25 a definite and fixed point of shifting, whereby the furrow openers are always raised to a certain defined high point (see Fig. 3). In the lowering operation, the limits of positive lowering action as effected by and through bar 55, as hereinbefore explained, may be varied by shifting filler member 57. The greatest amplitude of positive action upon the furrow openers will be effected by shifting the filler member to the extreme forward limits of slot 56, so that it will serve through fashioned portion 58 therein, together with the extreme forward wall of the slotted way, to perfectly house centering pin 54, but variations in such positive action upon the furrow members in the lowering operation may be effected at option by merely shifting filler member 57 within the possible limits shown to and from the forward end of said slotted way, to the end of effecting a greater or shorter length of clearance or lost motion space therein, whereby as bar 53 is retracted and rocker member 50 with its centering pin member 54 is similarly rocked rearwardly, the extent of movement of bar 55 is limited and controlled by the relative spacing of the filler member with respect to the centering pin member 54 on rocker member 50, to the end of varying the extent of shifting of the rocker arm 25, that is to say, that as the clearance space between the forward end of filler member 57 and centering pin member 54 varies, so will the length of the movement of bar 55 vary, whereby the purposes hereinbefore described for effecting a variation in the amplitude of movement of the furrow openers is attained. It will, of course, be understood that there should be employed in connection with the lifting devices herein, connecting means between said lifting means and the furrow openers of substantially the nature illustrated herein.

I have shown herein my preferred plan of carrying out the operation of my invention, but I desire to note that it is entirely within my conception that it may as well be carried out by applying the shiftable spacing member to reach bar 53 and the controlling means therefor, as by applying this feature to rocker bar 55.

What is claimed is:

1. In a machine of the character described, in combination, a rotatable driven member, a rockable member, and means for converting the rotary action of the driven member into a variable rocking motion of the rocker member, comprising an eccentric on the rotative member, an arm on the rocker member, a swingable member spaced from said eccentric and arm, provided with pivoting means at its swinging end, a bar connecting the eccentric with the swinging member, a bar connected, one end, with the arm on the rockable member, having a longitudinal slot in its opposed end engageable with the pivot member on the swinging member, to provide a relative shiftable connection therewith, and an adjustable filler member in said slot so related as to length therewith, whereby through adjustment, variable lengths of clearance space are provided to facilitate variation of the length of movement of said bar.

2. In a machine of the character described, in combination, a rotatable driven member, a rockable member, and means for converting the rotary action of the driven member into a variable rocking motion of the rocker member, comprising an eccentric on the rotative member, an arm on the rocker member, a swingable member spaced from said eccentric and arm, provided with pivoting means at its swinging end, a bar connecting the eccentric with the swinging member, a bar connected, one end, with the arm on the rockable member, having a longitudinal slot in its opposed end engageable with the pivot member on the swinging member, to provide a relative shiftable connection therewith, an adjustable filler member in said slot related as to length therewith, whereby through adjustment, variable lengths of clearance space is provided to facilitate variation of the length of movement of said bar, and means for shifting said filler member in the slot.

3. In a device of the class described, in combination, a rotative member, a rockable member and means for converting the rotary action of the rotative member into a rocking action of the rockable member, comprising a swingable member spaced laterally from said rotative and rockable members, bars, one end of each having a common connection with the swinging member, and their opposed ends connected respectively, that with the rotative member, in a relation to cause reciprocation thereof, and the other in an eccentric relation, the connecting bar between the swinging member and the rocking member being provided with a longitudinal slot engageable with the swinging member, and a shiftable member in said slot, adapted to be adjusted and fixed in different positions, to vary the length of the clearance space in the slot.

4. In a seeding machine, in combination, a driven axle provided with an eccentric thereon, a rock shaft having a laterally extending arm, and mechanism for converting the rotary action of the axle into a rocking action of the rock shaft, comprising a swingable member having centering pins thereon, a bar, one end connected with a centering pin of the swingable member, and the other end with the eccentric member on the axle, a bar, one end eccentrically connected with the rock shaft, the other end provided with a longitudinal slot engageable with a centering pin on the swingable member and also provided with a ratchet segment thereon, a filler member related for adjustment in the slot in said bar, and a lever connected with said filler member and related to the ratchet segment on the bar in a manner to facilitate adjustment of the filling member within the slot.

5. In a seeding machine, in combination, a driven axle provided with an eccentric thereon, a bar and means for relating one end of said bar to said eccentric to facilitate reciprocation thereof, a rock shaft, a bar, one end eccentrically related to the rock shaft provided with a longitudinal slot at its other end, a swingable member spaced laterally from the axle and rock shaft, having a common supporting and centering connection with said first mentioned bar, and with the slot in the other bar, a filler member in the slot in said bar proportioned and related thereto in a manner that, through adjustment of said member in said slot, variable clearance space is provided to facilitate clearance action between the swingable member and the bar, whereby the length of reciprocation of the latter may be varied.

In testimony whereof I have affixed my signature.

PAUL L. HATFIELD.